United States Patent Office 3,478,518
Patented Nov. 18, 1969

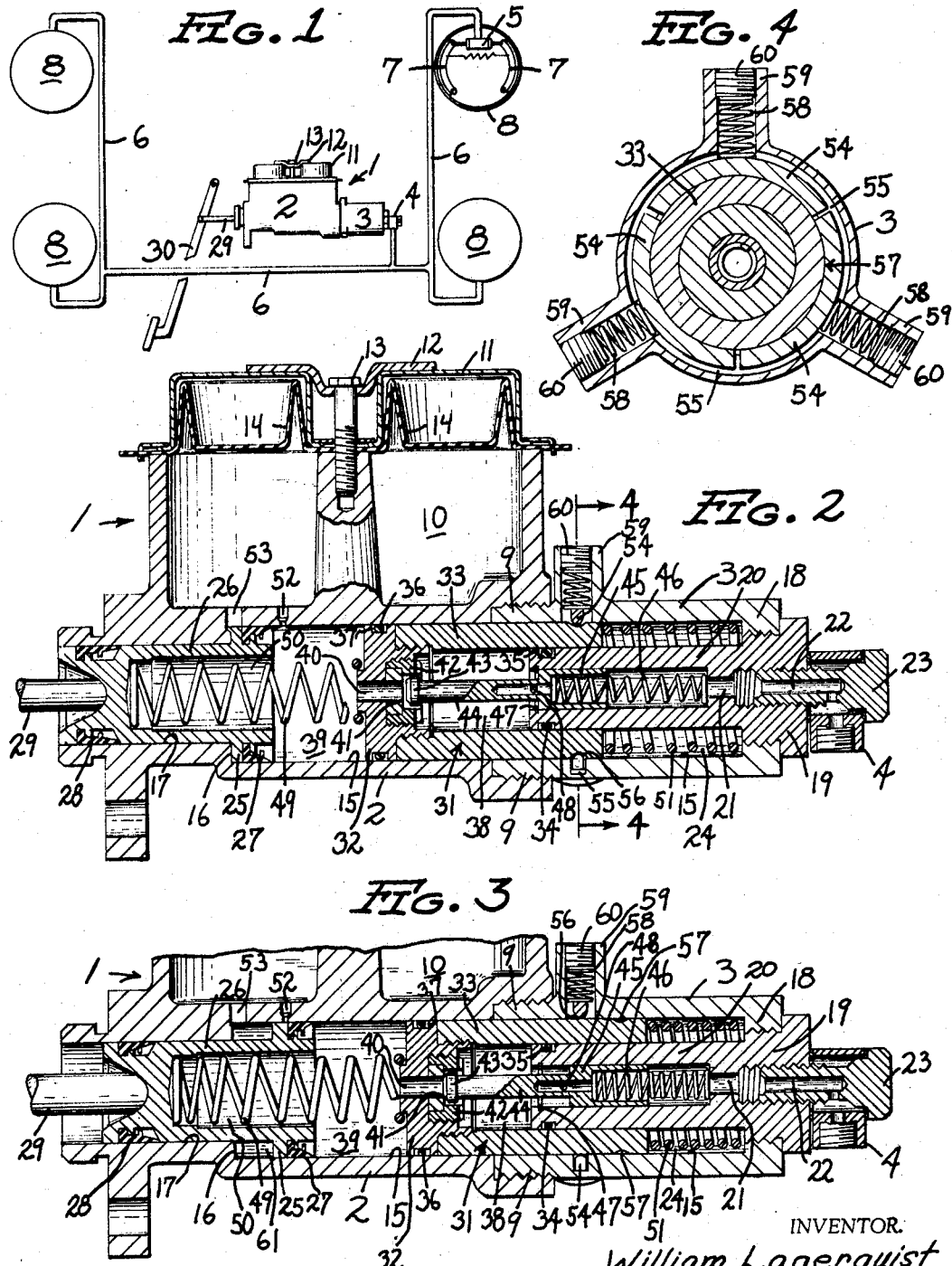

3,478,518
COMPOUND MASTER BRAKE CYLINDER
William Lagerquist, North Mankato, Minn., assignor to Minnesota Automotive, Inc., Mankato, Minn., a corporation of Minnesota
Filed Aug. 16, 1968, Ser. No. 753,218
Int. Cl. F15b 7/08, 7/00
U.S. Cl. 60—54.6        10 Claims

ABSTRACT OF THE DISCLOSURE

A fixed primary piston and an axial movable secondary piston are disposed in opposite end portions of a cylinder, an axially floating piston being disposed between the primary and the secondary pistons and cooperating therewith to define a smaller diameter high pressure chamber and a larger diameter low pressure chamber connected by a check valve equipped passage in the floating piston, and communicating respectively with a fluid outlet and a fluid inlet. A releasable element holds the floating piston against movement until a predetermined pressure is reached in the low pressure chamber, the floating piston then moving in a direction toward the fixed piston to close the check valve and discharge fluid only from the high pressure chamber through said outlet.

---

An important object of this invention is the provision of a compound master brake cylinder wherein an initial fast flow of fluid may be delivered to a brake cylinder at relatively lower pressure to take up slack between a pair of cooperating brake elements, after which subsequent flow of fluid is delivered at relatively higher braking pressure with a generally constant actuating force being applied to the master cylinder.

Another object of this invention is the provision of a master brake cylinder having a floating piston cooperating with primary and secondary pistons to provide low and subsequent high pressure delivery of fluid to a brake cylinder, and novel means for releasably holding the floating piston against axial movement in the cylinder and responsive to a predetermined rise in pressure in the cylinder to release said floating piston for high pressure fluid delivery.

To the above ends, a cylinder is provided, having a fixed axial primary piston therein at one end portion of the cylinder, an axially movable secondary piston at the opposite end portion of the cylinder, and a floating piston axially movable between the primary and secondary pistons and having an axially extended sleeve portion slidably encompassing the primary piston, the primary and floating pistons cooperating to define a relatively small diameter high pressure chamber for communication with a brake cylinder through an outlet passage. The floating and secondary pistons cooperate with the cylinder to define a relatively large diameter low pressure chamber communicating with a fluid reservoir through an inlet opening in the cylinder. The floating piston defines a fluid passage between the chambers, and a spring operated check valve is operable to close the fluid passage responsive to movement of the floating piston toward the primary piston. The floating piston is releasably held against axial movement in the cylinder by a detent which, when a predetermined pressure is built up in the low pressure chamber by movement of the secondary piston toward the floating piston, releases the floating piston for common movement with the secondary piston toward the fixed primary piston to close the check valve and deliver fluid under high pressure from the high pressure chamber through the outlet passage.

DESCRIPTION OF THE DRAWINGS

FIGURE 1 is a diagrammatic view of a vehicle braking system, the master brake cylinder of this invention being shown in side elevation, some parts being broken away;

FIGURE 2 is an enlarged axial section of the master brake cylinder of this invention;

FIGURE 3 is a view corresponding to a portion of FIG. 2, but showing a different position of some of the parts; and FIGURE 4 is an enlarged transverse section taken on the line 4—4 of FIG. 2.

DETAILED DESCRIPTION

The compound master brake cylinder of this invention includes a housing 1 comprising a pair of cooperating housing sections 2 and 3, the latter of which is provided with an outlet fitting 4 that is connected to a plurality of brake cylinders 5 by conduit means 6. The brake cylinders 5, one of which is shown in FIG. 1, are operatively connected to cooperating brake shoes 7 mounted in brake drums 8. The brake cylinders 5, shoes 7 and brake drums 8 are of well known construction, and may be assumed to be each associated with a different vehicle wheel, not shown. The cylinders 5, shoes 7 and brake drums 8 do not, in and of themselves, comprise the instant invention. Hence, further detailed showing and description thereof is omitted, in the interest of brevity.

In the embodiment of the invention illustrated, the housing section 3 is generally tubular and has one tubular end 9 that is screw threaded into the lower portion of the housing section 2. The housing section 2 is formed to define a fluid reservoir 10 that is closed at its upper end by a cover element 11 held in place by a bracket 12 and an anchoring screw 13. A flexible expansion member 14 is interposed between the upper end of the reservoir 10 and the cover 11 and forms a seal therebetween.

The housing section 3 and lower portion of the housing section 2 are bored to provide an elongated cylinder wall 15, the housing section 2 being counter-bored to provide an annular shoulder 16 and a reduced diameter cylinder wall 17. The housing section 3 includes an outer end wall 18 that is screw threaded to receive the outer screw threaded end portion 19 of an elongated fixed primary piston 20 that extends axially inwardly from the end wall 18. The primary piston 20 is formed to provide an axial outlet passage 21 that communicates with the outlet fitting 4 through a passage portion 22 in an anchoring screw 23 that is screw threaded into the outer end portion 19 to mount the fitting 4 thereon. As shown in FIGS. 2 and 3, the diameter of the fixed primary piston 20 is substantially less than that of the cylinder wall 15, whereby to provide an annular space 24 therebetween.

A secondary piston 25 is disposed at the opposite end portion of the cylinder wall 15, and is formed to provide a reduced diameter shank portion 26 that is slidably mounted in the reduced diameter portion 17, axial movement of the secondary piston 25 being limited by engagement thereof with the annular shoulder 16, as shown in FIG. 2. The secondary piston 25 is provided with a cup-like seal 27 that sealingly engages the adjacent portion of the cylinder wall 15, the shank 26 being provided with an annular sealing element 28 that sealingly engages the reduced cylinder wall 17. In the embodiment illustrated, the secondary piston 25 is adapted to be moved axially toward the fixed primary piston 20 by an actuator rod 29 that is operatively coupled to a foot-operated lever or the like 30.

A floating piston 31 is disposed intermediate the fixed primary piston 20 and secondary piston 25, and comprises piston head 32 and an elongated sleeve portion 33 screw threaded thereto and extending axially toward the primary piston 20, the sleeve portion 33 encompassing the primary piston 20 and axially slidable thereon. Sealing engagement between the sleeve portion 33 and primary piston 20 is effected by an annular sealing ring 34 mounted in a radially outwardly opening circumferential channel 35 adjacent the inner end of the primary piston 20. In like manner, sealing engagement between the floating piston head 32 and the cylinder wall 15 is effected by an annular sealing ring 36 disposed in radially outwardly opening circumferential channel 37 in the floating piston head 32.

The fixed and floating pistons 20 and 31 respectively cooperate to define a relatively small diameter high pressure chamber 38, the secondary piston 25, floating piston 32 and adjacent portion of the cylinder wall 15 cooperates to define a relatively larger diameter low pressure chamber 39. The chambers 38 and 39 are connected by a fluid passage 40 extending axially through the floating piston head 32, an annular valve seat 41 and an annular valve seat retainer nut 42 screw threaded into piston head 32. The valve seat 41 cooperates with a valve element 43 to provide a check valve for the fluid passage 40, the valve element 43 including an axially extended stem 44 having an enlarged end portion 45 that is axially slidable in the adjacent portion of the outlet passage 21. A coil compression spring 46, mounted in the outlet passage 21 yieldingly urges the valve element 43 into seating engagement with the valve seat 41, the fixed primary piston 20 being provided with a snap ring 47 which engages the enlarged end portion 45 to limit movement of the valve element 43 toward seating engagement with the valve seat 41. The stem 44 is formed to provide passage means 48 for establishing communication between the high pressure chamber 38 and the outlet passage 21.

The secondary piston 26 is yieldingly urged toward engagement with the annular shoulder 16 by a coil compression spring 49 interposed between the pistons 25 and 32, the secondary piston 25 having an axial recess 50 which contains and supports one end portion of the spring 49. A second coiled compression spring 51 is interposed between the floating piston sleeve portion 33 and the end wall 18 of the housing section 3 and yieldingly urges the floating piston 31 axially toward the secondary piston 26. A fluid inlet 52 leading from the reservoir 10 to the low pressure cylinder chamber 39 is so disposed so that, when the secondary piston 25 is in its idle or inoperative position against the annular shoulder 16, communication is established between the reservoir 10 and low pressure chamber 39. A relief passage 53 extends from the reservoir 10 to the interior of the cylinder wall 15 adjacent the annular shoulder 16, for a purpose which will hereinafter become apparent. With reference to FIGS. 2 and 3, it will be seen that, when the lever equipped actuator 29 is operated to move the secondary piston 25 axially inwardly toward the floating piston 31 and primary piston 20, the fluid inlet 52 is covered or closed by the secondary piston 25, so that the reservoir 10 is isolated from the chambers 38 and 39 during the braking operation.

Means for releasably holding the floating piston 31 in a predetermined position of its axial movement between the primary and secondary pistons 20 and 25 comprises a plurality of circumferentially spaced arcuate detent sections 54 that are generally radially movably mounted in a radially inwardly opening channel 55 in the housing section 3. The detent sections 54 have cross sectionally curved radially inner edge portions 56 that are received in a radially outwardly opening circumferential recess 57 in the floating piston sleeve portion 33. The detent sections 54 are yieldingly urged radially inwardly toward the recess 57 by coil compression springs 58 contained within tubular bosses 59 extending radially from the housing section 3 and having screw threaded outer ends for reception of adjusting screws 60. As shown in FIG. 4, the springs 58 are each interposed between a respective adjusting screw 60 and the intermediate portion of a respective one of the detent sections 54. The yielding bias of the springs 58 is sufficient to hold the floating piston 31 against axial movement imparted thereto by the spring 51 toward the secondary piston 25, when the detent elements 54 are received in the circumferential recess 57. It will be noted, with reference to FIG. 2, that when the detent sections 54 are received in the recess 57, the floating piston 31 is so disposed relative to the check valve element 43 that fluid communication is established between the chambers 38 and 39 through the fluid passage 40.

OPERATION

Assuming that the brake system including the brake cylinders 5, conduit means 6, chambers 38 and 39 are filled with hydraulic fluid, and that a supply of the fluid is contained within the reservoir 10, the secondary piston 25 and floating piston 31 assume the positions shown in FIG. 2 when the master cylinder is deenergized. When braking pressure is applied to the brake lever 30, the actuator rod 29 moves the secondary piston 25 toward the floating piston 31, against yielding bias of the spring 49. The inlet opening 52 is so disposed that initial inward movement of the secondary piston 25 will cover the inlet 52 to close off communication between the reservoir 10 and low pressure chamber 39. Further, such initial movement of the secondary piston 25 causes fluid to be delivered from the chamber 39 through the fluid passage 40 into the chamber 38, and from thence through the passage means 48, outlet passage 21, conduit means 6 to the brake cylinders 5, whereby the brake shoes 7 are moved into engagement with their respective brake drums 8. Continued pressure of the actuator rod 29 against the secondary piston 25 then causes a pressure build-up in the low pressure chamber 39 sufficient to overcome resistance of the detent sections 54 and move the floating piston 31 toward the primary fixed piston 20. Initial movement of the floating piston 31 toward the primary piston 20 will seat the check valve element 43 against the valve seat 41, and the secondary piston 25 and floating piston 31 will move as a unit toward the primary piston 20. The primary piston 20 and chamber 38 being of substantially smaller diameter than the secondary piston 25 and pressure chamber 39, fluid will be then forced outwardly through the outlet passage 21 to the brake cylinders 5 at a substantially higher pressure with substantially constant braking effort being applied to the lever 30. With reference to FIG. 3, it will be seen that under full braking pressure, the detent sections 54 ride upon the outer cylindrical surface of the floating piston sleeve portion 33, and that the check valve element 43 moves axially with the floating piston 31 against bias of the spring 46. As the secondary piston 25 moves axially inwardly, or to the right with respect to FIGS. 2 and 3, fluid flows into the annular space, indicated at 61 in FIG. 3, between the piston 25 and annular shoulder 16 through the relief passage 53, whereby to relieve any partial vacuum that might otherwise be generated in the annular space 61.

Upon release of pressure against the brake lever 30, the springs 49 and 51 return the secondary piston 25 and floating piston 31 to their deenergized positions of FIG. 2, the detent sections 54 entering the recess 57 to limit movement of the floating piston 31 toward the secondary piston 25. During this return movement of the secondary and floating pistons, the spring 46 moves the check valve element 43 toward engagement with the enlarged end 45 thereof with the snap ring 47 to permit reopening of the fluid passage 40 as the floating piston 31 approaches its limit of movement toward the secondary piston 25. As the secondary piston 25 approaches engagement with the annular shoulder 16, fluid within the annular space 61 returns to the reservoir 10 through the relief passage 53.

In a typical compound master brake cylinder made in accordance with this invention, the cylindrical wall 15 and secondary piston 25 have a diameter of one and onehalf inches, the primary piston 20 having a diameter of one inch. Compression of the springs 58 is adjusted by means of the screws 60 to load the detent elements 54 so that they will hold the floating piston 31 against axial movement toward the primary piston 20 until a pressure of 375–400 pounds per square inch is generated in the low pressure chamber 39, at which time pressure of the detent elements 54 is overcome and the floating piston 31 moves axially toward the primary piston 20 closing the valve element 43 against the valve seat 42. Transfer of pressure to the smaller diameter chamber 38 thus gives a much greater pressure within the brake system with substantially constant effort applied to the brake pedal or lever 30.

It will be further appreciated that, should any of the hydraulic fluid be lost from the system due to leakage or wear in the brake cylinders 5, the same is immediately replenished from the reservoir 10 through the inlet 52 when the brake is released.

What is claimed is:
1. In a compound master brake cylinder:
   (a) a fluid reservoir;
   (b) a cylinder having an inlet for communication with said reservoir;
   (c) a primary fixed piston extending axially within said cylinder from one end thereof and defining a fluid outlet;
   (d) a secondary piston extending axially within the cylinder from the opposite end thereof and axially movable toward and away from the primary piston;
   (e) a floating piston axially movably mounted in the cylinder between said primary and secondary pistons and having a sleeve portion slidably encompassing said primary piston, said floating piston cooperating with said primary piston to define a relatively small diameter high pressure fluid chamber communicating with said outlet, and with said cylinder and secondary piston to define a relatively large diameter low pressure chamber communicating with said reservoir through said inlet, said secondary piston being movable toward said floating and primary piston and defining a fluid passage between the high and low pressure chambers;
   (f) a one-way check valve operative to close said fluid passage;
   (g) and releasable means for releasably holding said floating piston against axial movement in the direction of said primary piston and operative to release said floating piston for fluid discharging movement toward said primary piston responsive to a predetermined secondary piston imparted increase in said low pressure chamber.

2. The master brake cylinder defined in claim 1, characterized by yielding means urging said secondary piston in a direction away from said primary and floating piston.

3. The master brake cylinder defined in claim 2, in which said yielding means comprises a pair of coil compression springs, one interposed between said secondary and floating piston and the other interposed between said floating piston and the end of the cylinder adjacent said primary pitson, said springs urging said floating piston toward a position in intermediate spaced relationship to said primary and secondary pistons.

4. The master brake cylinder defined in claim 1, in which said check valve comprises a valve seat in said floating piston and a cooperating valve stem axially slidably carried by said primary piston, characterized by spring means urging said valve stem toward seating engagement with said valve seat.

5. The master brake cylinder defined in claim 4, characterized by stop means in said primary piston limiting movement of said valve toward seating engagement with said valve seat, said releasable means normally disposing said floating piston in a position relative to said primary piston wherein said check valve is open.

6. The master brake cylinder defined in claim 1, in which said releasable means comprises a detent movably mounted in said cylinder and operatively engaging said floating piston, and spring means urging said detent toward engagement with said floating piston.

7. The master brake cylinder defined in claim 6, in which the sleeve portion of said floating piston defines a radially outwardly opening recess, said detent having a portion normally seated in said recess.

8. The master brake cylinder defined in claim 7, in which said recess extends circumferentially about said sleeve portion, said detent comprising a plurality of circumferentially spaced arcuate detent sections mounted in said cylinder for radial movement toward and away from said recess, said last-mentioned spring means comprising a plurality of springs, one each engaging a different one of said detent sections.

9. The master brake cylinder defined in claim 8, characterized by a plurality of circumferentially spaced radial adjusting screws mounted in said cylinder and each engaging a different one of said detent section engaging springs to adjust the bias thereof against their respective detent section.

10. The master brake cylinder defined in claim 1, in which said cylinder defines an abutment portion limiting movement of said secondary piston in a direction away from said floating and primary pistons, said inlet being disposed in said cylinder to be closed by said secondary piston during initial movement thereof toward said floating and primary piston.

References Cited

UNITED STATES PATENTS 2,041,164   5/1936   Carroll.
3,186,174   6/1965   Hayman.

MARTIN P. SCHWADRON, Primary Examiner
ROBERT R. BUNEVICH, Assistant Examiner